United States Patent
Silver et al.

(10) Patent No.: US 12,093,658 B1
(45) Date of Patent: Sep. 17, 2024

(54) SYSTEMS AND METHODS FOR IMPLEMENTING AN ARTIFICIAL INTELLIGENCE-BASED SOLUTION FOR PROMPT ORCHESTRATION BY SEGREGATING PROCESSING REQUESTS INTO NON-SERIALIZED TASKS

(71) Applicant: Citibank, N.A., New York, NY (US)

(72) Inventors: Miriam Silver, Tel Aviv (IL); Nimrod Barak, New York, NY (US); Prag Sharma, New York, NY (US); Avi Gefen, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/531,671

(22) Filed: Dec. 6, 2023

(51) Int. Cl.
*G06F 40/40* (2020.01)

(52) U.S. Cl.
CPC .................................. *G06F 40/40* (2020.01)

(58) Field of Classification Search
CPC ...... G06F 40/40; G06F 16/3329; G06F 40/30; G06F 18/214; G06F 3/0481; G06F 40/35; G06F 16/243; G06F 16/90332; G06F 3/167; G06F 16/3344; G06F 16/40; G06F 16/9024; G06F 16/904; G06F 18/2148; G06F 18/217; G06F 18/2178; G06F 3/0488; G06F 3/165; G06F 40/20; G06F 40/205; G06F 40/274; G06F 40/284; G06F 8/30; G06F 8/35; G06F 8/38; G06F 9/451; G06F 16/2423; G06F 16/24522; G06F 16/2455; G06F 16/951; G06F 18/23; G06F 3/0483; G06F 3/04883; G06F 40/211; G06F 40/279; G06F 40/289; G06F 40/295; G06F 8/10; G06F 8/31; G06F 8/34; G06F 8/75
See application file for complete search history.

(56) References Cited

U.S. PATENT DOCUMENTS

| | | | |
|---|---|---|---|
| 11,756,544 B2 * | 9/2023 | Sharifi | G06F 3/0481 704/257 |
| 2019/0251169 A1 * | 8/2019 | Loghmani | G06F 40/295 |
| 2021/0312277 A1 * | 10/2021 | Prabhudesai | G06F 11/3466 |
| 2023/0112921 A1 * | 4/2023 | Cai | G06F 8/34 717/104 |
| 2023/0153356 A1 * | 5/2023 | Buckley | G06F 16/90332 704/275 |
| 2023/0280985 A1 * | 9/2023 | Hayashi | G06F 8/10 717/104 |
| 2023/0316006 A1 * | 10/2023 | Tunstall-Pedoe | G06F 40/56 704/9 |
| 2023/0325384 A1 * | 10/2023 | Nallapati | G06F 16/2423 707/760 |

* cited by examiner

*Primary Examiner* — Abdelali Serrou
(74) *Attorney, Agent, or Firm* — Foley & Lardner LLP

(57) ABSTRACT

Systems and methods are described herein for a prompt engine microservice. The system may segregate a received request into a search function, a calculation function, and a schema selection function. The system may also create a new aggregation function that aggregates the results of the various processes into an input for an artificial intelligence model. By doing so, the system may process the new plurality of tasks in parallel and without the initial use of the artificial intelligence model.

20 Claims, 5 Drawing Sheets

SYSTEMS AND METHODS FOR IMPLEMENTING AN ARTIFICIAL INTELLIGENCE-BASED SOLUTION FOR PROMPT ORCHESTRATION BY SEGREGATING PROCESSING REQUESTS INTO NON-SERIALIZED TASKS

BACKGROUND

Prompt orchestration is a process of determining steps to take when given a prompt. This can be a complex task, as it requires understanding the intent of the prompt, the context in which it is given, and the resources that are available. Traditional prompt orchestration systems are typically rule-based. This means that they rely on a set of rules to determine the next steps. However, rule-based systems can be difficult to maintain and can be brittle, meaning that they may not work well for all prompts.

Artificial intelligence, including, but not limited to, machine learning, deep learning, etc. (referred to collectively herein as artificial intelligence models, machine learning models, or simply models) may allow for prompt orchestration systems that are more flexible than rule-based systems. However, despite potential benefits, practical implementations of artificial intelligence for prompt orchestration have been hindered by several technical problems.

SUMMARY

Systems and methods are described herein for novel uses and/or improvements to artificial intelligence applications for prompt orchestration. As one example, systems and methods are described herein for a prompt engine microservice that overcomes the technical problems associated with using an artificial intelligence-based solution for generating prompts.

For example, artificial intelligence models, like large-scale neural networks, comprise millions or even billions of parameters. Training these models requires significant computational power, memory, and storage resources as it involves performing numerous calculations for forward and backward propagation through the neural network layers. This process requires powerful Graphics Processing Units (GPUs) or Tensor Processing Units (TPUs) to handle the computations efficiently. Additionally, storing the model's parameters and intermediate computations during training can demand significant memory capacity. Training large artificial intelligence models can take days, weeks, or even months, depending on the complexity of the model and the size of the dataset. This extended training time translates to prolonged usage of resources. Moreover, even once a model is trained, processing inputs can likewise take days, weeks, etc., and require ongoing computational power, memory, and storage resources.

In contrast, prompt microservices need to generate prompts quickly and in a resource-efficient manner. For example, prompt generation speed directly impacts user experience. Fast response times create a seamless and engaging interaction, especially in applications like chatbots, virtual assistants, or customer support systems. Users expect quick and relevant responses to their queries or requests. As another example, many applications, such as gaming, live chats, financial trading, or real-time decision-making systems, require prompt generation in milliseconds or less to ensure timely and effective outcomes. As yet another example, efficient prompt generation allows systems to scale effectively, handling numerous simultaneous requests without significant delays. This scalability is crucial for platforms experiencing high traffic or serving a large user base concurrently. Finally, quick prompt generation itself can optimize resource usage, minimizing computational load and energy consumption. Efficient handling of prompt generation contributes to cost-effectiveness, especially in cloud-based services where resource allocation can impact expenses.

To achieve a prompt engine microservice that overcomes the technical problems associated with using an artificial intelligence-based solution for generating prompts, the systems and methods increase throughput and efficiency by segregating processing requests into non-serialized, function-specific subtasks and subprocesses. For example, in a conventional approach, a prompt engine microservice may receive a request to generate a prompt. The system then queues that request and processes it in a serial nature using a traditional prompt orchestration rule-based system. Replacing this serial approach with an artificial intelligence-based solution creates a technical problem in that running an artificial intelligence model increases the resources required and the throughput time for each request, creating bottlenecks in the queue. Furthermore, adding additional artificial intelligence models exponentially increases the computing resources required to run the already resource-strained system.

To overcome these technical problems, the system segregates a received request into a plurality of tasks based on a function required prior to inputting in an artificial intelligence model. For example, the system may segregate a received request into a search function, a calculation function, and a schema selection function. The system may also create a new aggregation function that aggregates the results of the various processes into an input for an artificial intelligence model. By doing so, the system may process the new plurality of tasks in parallel and without the initial use of the artificial intelligence model. That is, the system may preprocess data related to the request to perform one or more functions that do not require the artificial intelligence model for efficiency processing. Furthermore, the additional aggregation function prepares the results from the various functions into a format that increases compatibility and reduces processing complexity for the input to the artificial intelligence model.

While counterintuitive to increase the number of functions needed to process a request, the system improves the overall efficiency because the less complex functions are able to be processed by less computationally demanding and scarce resources. Moreover, the resources that are used to process the plurality of functions can be more easily duplicated than the artificial intelligence model.

In some aspects, systems and methods for implementing an artificial intelligence-based solution for prompt orchestration segregate processing requests into non-serialized, function-specific subtasks. For example, the system may receive a first prompt request, wherein the first prompt request comprises a prompt requirement and a prompt context. The system may determine a first plurality of tasks for responding to the first prompt request. The system may determine a first subset of the first plurality of tasks for a first artificial intelligence model, wherein the first artificial intelligence model is trained to generate prompt responses using a first prompt schema. The system may determine, at the prompt orchestration microservice, a second subset of the first plurality of tasks for a first plurality of non-serialized functions. The system may generate a plurality of outputs from the first plurality of non-serialized functions. The system may generate a first input for the first artificial intelligence model based on outputs from the first plurality of non-serialized functions. The system may input the first input into the first artificial intelligence model to generate a first prompt response. The system may generate for display, on a user interface, the first prompt response.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
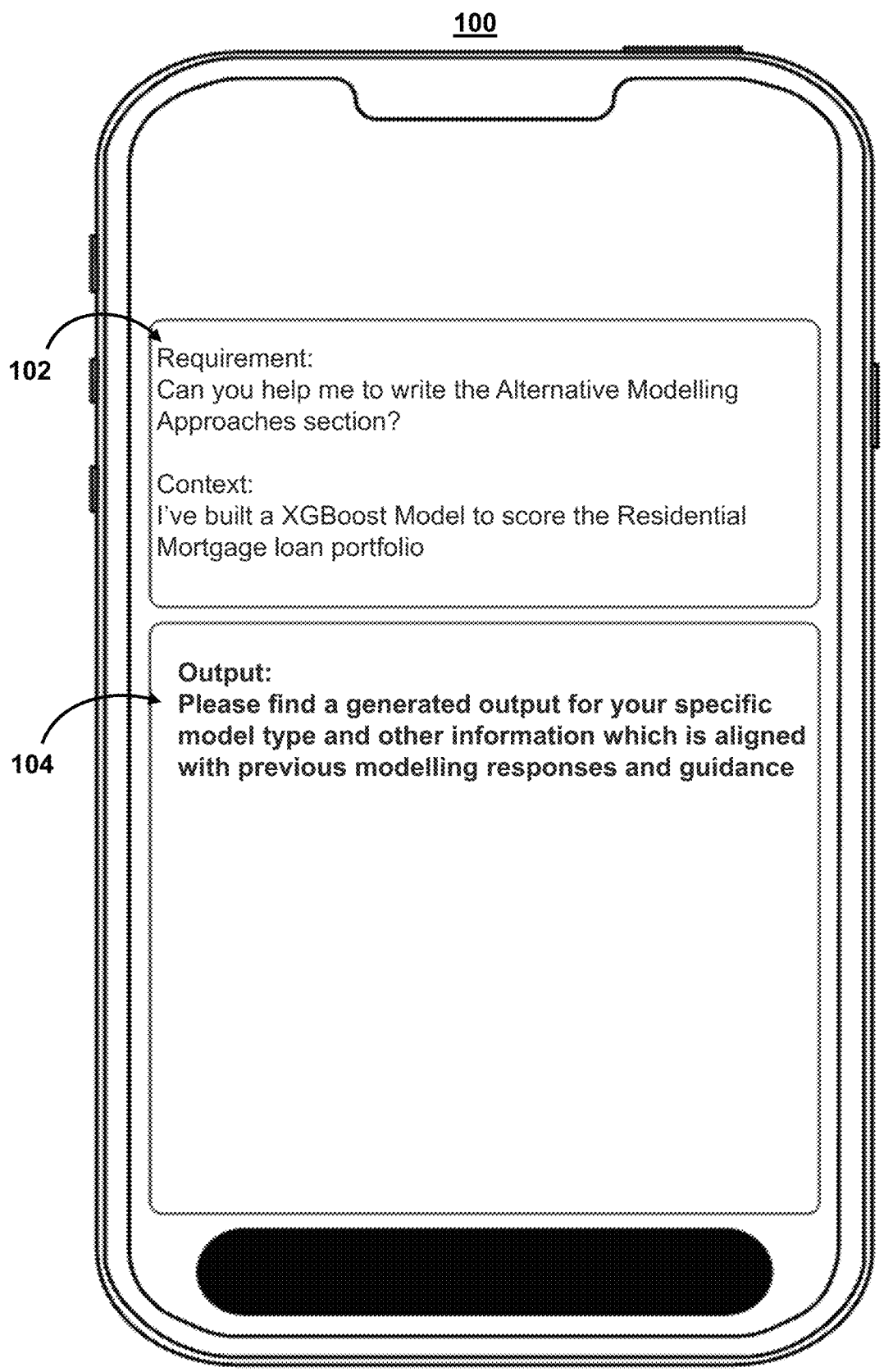
FIG. 1 shows an illustrative user interface for sending requests and receiving responses from a prompt orchestration system, in accordance with one or more embodiments.

FIG. 1 shows an illustrative user interface for sending requests and receiving responses from a prompt orchestration system, in accordance with one or more embodiments. For example, user interface 100 may implement an artificial intelligence-based solution for prompt orchestration by segregating processing requests into non-serialized, function-specific subtasks. As referred to herein, a "user interface" may comprise a human-computer interaction and communication in a device, and may include display screens, keyboards, a mouse, and the appearance of a desktop. For example, a user interface may comprise a way a user interacts with an application or a website. In some embodiments, user interface 100 may provide interfaces or tools for users to interact with prompts effectively. This could involve dashboards, APIs, or other user-friendly interfaces for managing and utilizing prompts efficiently.

User interface 100 may receive prompt requests and prompt responses that may comprise content. As referred to herein, "content" should be understood to mean an electronically consumable user asset, such as internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

User interface 100 may implement a prompt orchestration system. A prompt orchestration system may be a tool or framework designed to manage, coordinate, and/or optimize the usage of prompts in language models, particularly in the context of few-shot or zero-shot learning. Prompts may be specific instructions or examples provided to guide language models in generating desired outputs or performing certain tasks. The prompt orchestration system may assist in creating effective prompts. The prompt orchestration system may involve designing prompts that encapsulate the task or the desired output in a way that the language model can understand and execute. This could include providing examples, specifying keywords, or structuring the prompt language to elicit the desired response. The prompt orchestration system may manage a repository or library of prompts, ensuring their quality, relevance, and usability across various tasks or domains. It might involve organizing prompts, categorizing them based on tasks or use cases, and curating them for optimal performance. The prompt orchestration system may optimize prompts, which involves refining and improving them to enhance model performance. This optimization may include fine-tuning prompt structures, adjusting keywords or instructions, and analyzing the effectiveness of different prompts through experimentation.

In some embodiments, the prompt orchestration system may facilitate dynamic prompt generation or adaptation. In such cases, the system may automatically adjust prompts based on model feedback or user interaction, optimizing prompts on-the-fly to improve performance. For example, the goal of a prompt orchestration system may be to streamline the process of using prompts with language models, making it easier for users to leverage the power of these models across various tasks while ensuring optimal performance and accuracy. The system may play a crucial role in facilitating the effective utilization of language models in real-world applications by abstracting the complexities of prompt design and management.

In some embodiments, the prompt orchestration system may be integrated into workflows or applications, allowing seamless integration of prompts for specific tasks. They could be used in chatbots, question-answering systems, content generation, or any scenario where language models need to perform predefined tasks. Additionally or alternatively, the system may monitor the performance of prompts and language models to assess their effectiveness. It involves analyzing metrics, evaluating outputs, and refining prompts based on performance feedback.

As shown in FIG. 1, user interface 100 may receive a prompt request. A prompt request may refer to a specific query or directive submitted to the system, prompting the language model to perform a particular task or generate a desired output. The prompt request typically contains the instructions or examples that guide the language model's behavior. For example, as shown in FIG. 1, prompt request 102 may include both a requirement and a context. The requirement may define the task or objective that the language model needs to accomplish. It may specify the type of output or response required from the model, such as answering a question, summarizing text, generating code, or completing a task in a specific domain. Depending on the task, the prompt request may additionally or alternatively include context or input data that the language model should consider while generating the output. This could be in the form of text, images, or any other relevant information necessary to complete the task. For example, the prompt requirement may comprise a requirement for a first prompt response, and the prompt context may comprise a context for generating the first prompt response.

The prompt request may also include a requested structure of the prompt provided to the language model. This may involve providing examples, keywords, context, or any specific formatting required to guide the model in generating the desired output. The structure of the prompt is crucial as it influences the model's understanding of the task and the quality of the generated response. The prompt request may also include specific parameters, constraints, or preferences that guide the model's behavior. For instance, it might specify the desired length of the output, the style or tone to be used, or any limitations on the content generated. The prompt requests might contain metadata or identification information associated with the request, such as timestamps, user IDs, request IDs, or any other relevant information used for tracking and managing prompt execution within the system.

In response to a prompt request, user interface 100 may generate a prompt response (e.g., prompt response 104). A prompt response may comprise a response to the prompt request. For example, a prompt response to a prompt request may refer to the output generated by the language model (e.g., the prompt orchestration system) based on the instructions, examples, or guidelines provided in the prompt. The response may be the result of the model's interpretation and processing of the input prompt and any accompanying context or parameters.

In some embodiments, the prompt response may be defined by and/or include one or more characteristics. For example, the response is the output produced by the language model in accordance with the instructions given in the prompt. This output could take various forms depending on the nature of the task, such as text, code, summaries, translations, or any other relevant content generated by the model. The response may aim to fulfill the task or objective specified in the prompt request. For instance, if the prompt requested the model to answer a question, the response would ideally contain the generated answer. If the task was text generation based on a provided prompt, the response would include the generated text. As the quality and accuracy of the response may be crucial, the system may aim to ensure that the response reflects a correct, relevant, coherent, and contextually appropriate output based on the prompt. The system may evaluate response quality through metrics, human feedback, or validation against ground truth data.

In some embodiments, the response may adhere to any constraints or parameters specified in the prompt request. For instance, if the prompt requested a short summary, the response should be concise and within the specified length limit. Responses may also contain additional metadata or context, such as timestamps, identifiers, or any supplementary information related to the generated output. This metadata can assist in tracking and managing responses within the orchestration system.

The prompt orchestration system facilitates the generation of responses by interacting with the language model based on the provided prompt request. It receives the output from the model, processes it if necessary, and delivers the response back to the user or application that initiated the prompt request. The goal is to ensure that the generated response meets the requirements outlined in the initial prompt, thereby enabling effective task completion or content generation by leveraging the language model's capabilities.

Figure 2:
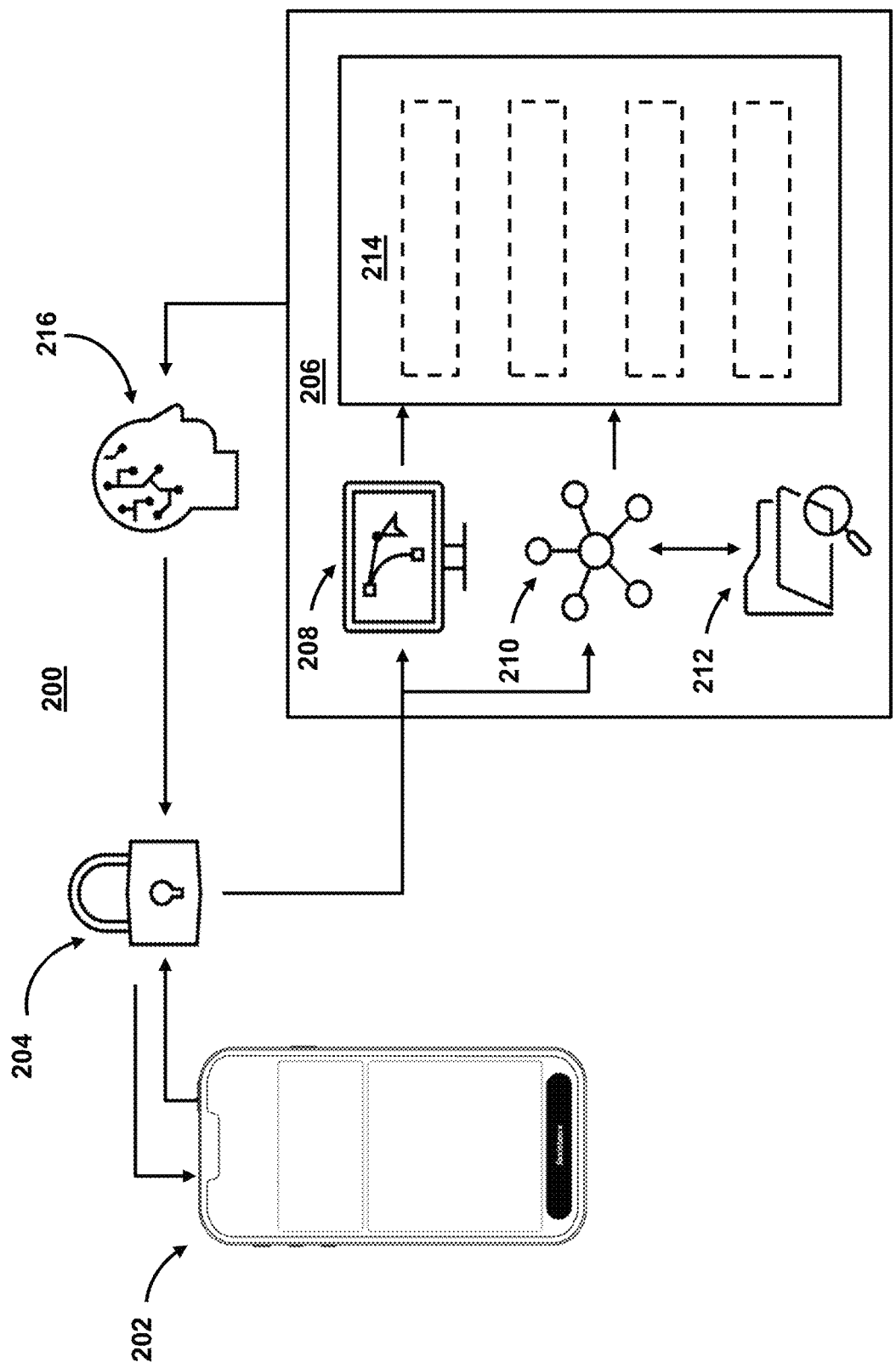
FIG. 2 shows an illustrative diagram for implementing an artificial intelligence-based solution for a prompt orchestration system, in accordance with one or more embodiments.

FIG. 2 shows an illustrative diagram for implementing an artificial intelligence-based solution for a prompt orchestration system, in accordance with one or more embodiments. For example, system 200 may implement an artificial intelligence-based solution for prompt orchestration by segregating processing requests into non-serialized, function-specific subtasks.

System 200 comprises user interface 202. System 200 may receive, via user interface 202, a first prompt request, wherein the first prompt request comprises a prompt requirement and a prompt context, wherein the prompt requirement comprises a requirement for a first prompt response, and wherein the prompt context comprises a context for generating the first prompt response. For example, user interface 202 may correspond to user interface 100 (FIG. 1) and/or may receive a prompt request and/or generate a prompt response.

In response to receiving the first prompt request, system 200 may transmit the first prompt request via a secure communication protocol (e.g., protocol 204). A secure communication protocol for a prompt orchestration system may be used to safeguard the transmission of sensitive data, prompt requests, and responses between different components within the system. Security measures are crucial to protect against potential threats, including unauthorized access, interception, tampering, or data breaches.

Protocol 204 may comprise a Transport Layer Security (TLS)/Secure Sockets Layer (SSL). TLS and SSL are cryptographic protocols used to establish secure connections over a network. Protocol 204 may ensure data confidentiality and integrity by encrypting communication between different components, such as between client-server interactions or API calls within the prompt orchestration system. Protocol 204 may comprise Hypertext Transfer Protocol Secure (HTTPS). HTTPS is an extension of HTTP that uses TLS/SSL to secure communication between web browsers and servers. Implementing HTTPS for web-based interfaces or APIs in the prompt orchestration system helps protect data transmitted between users and the system. Protocol 204 may use authentication mechanisms to verify the identities of users, components, or services accessing the prompt orchestration system. This may include username/password authentication, API keys, tokens, or other forms of authentication protocols (e.g., OAuth) to ensure authorized access only. Protocol 204 may enforce strict access control policies based on roles and permissions and limit access to sensitive data and functionalities within the prompt orchestration system to authorized users or components, reducing the risk of unauthorized actions. Protocol 204 may ensure that sensitive data, including prompt requests, responses, and stored information, is encrypted not only during transmission but also when stored on disk or in databases.

System 200 may receive, at prompt orchestration microservice 206, the first prompt request. A prompt orchestration microservice (e.g., prompt orchestration microservice 206) is a small, independent, and/or specialized component within a larger prompt orchestration system that is responsible for managing specific aspects of prompt creation, execution, or coordination. Microservices architecture involves breaking down complex applications into smaller, loosely coupled services that can be developed, deployed, and scaled independently, promoting flexibility and scalability in the system. Each microservice typically performs a specific set of functions related to prompt orchestration, and they communicate with each other through APIs or messaging protocols. This modular approach allows for easier development, maintenance, and scalability of the prompt orchestration system. Microservices can be deployed independently, enabling updates or modifications to one service without affecting the entire system, promoting agility and resilience. Moreover, microservices architecture enables easier integration with other systems, promotes reusability of components, and allows teams to work on different parts of the system simultaneously, fostering a more efficient and agile development process.

Prompt orchestration microservice 206 may comprise a combination of hardware and software components that work together to facilitate the creation, management, and execution of prompts for language models. These components collectively enable the interaction between users, language models, and other system elements. The system may run on dedicated servers or utilize cloud infrastructure (such as AWS, Azure, Google Cloud) to host the necessary software components, databases, and storage. Hardware components like routers, switches, and firewalls are essential for network connectivity and security within the infrastructure. Hardware components such as hard drives, solid-state drives (SSDs), or cloud-based storage solutions are used to store data, prompts, models, and system configurations. High-performance hardware accelerators like Graphics Processing Units (GPUs) or specialized AI accelerators may also be used to enhance the performance of language models during inference and training.

Prompt orchestration microservice 206 may comprise an orchestration engine. This software component manages the overall orchestration process, handling prompt requests, directing interactions with language models, and coordinating responses. These hardware and software components collectively form the infrastructure and functionalities of a prompt orchestration system, enabling efficient management, execution, and optimization of prompts for language models across various applications and domains.

Prompt orchestration microservice 206 may comprise task segregator 208. Task segregator 208 may determine a first plurality of tasks for responding to the first prompt request. A "task" may refer to a specific action or objective that needs to be performed by a language model or a related component in response to a prompt request. Tasks are defined by the nature of the requested action and guide the language model on what output or action is expected. For example, a task may comprise question answering. In such cases, tasks may involve the language model being prompted with a question and being expected to generate a relevant and accurate answer based on its understanding of the provided information. Other examples of tasks may involve text generation (e.g., asking the language model to generate coherent and contextually relevant text based on a given prompt), Language Translation (e.g., providing a prompt in one language and requesting the language model to generate the equivalent text in another specified language), Code Generation or Completion (e.g., requesting the model to generate code snippets, complete code segments, or assist in programming tasks based on provided prompts or examples), Summarization (e.g., asking the language model to summarize a piece of text or a document into a shorter, condensed version while retaining the key information), Image Captioning (e.g., providing an image prompt and asking the model to generate a descriptive caption or text that describes the content of the image), Sentiment Analysis (e.g., requesting the model to analyze the sentiment expressed in a given text or document and provide information about the sentiment conveyed).

In some embodiments, a task may comprise document (or other content) retrieval, search, and/or analysis. For example, content retrieval may refer to the process of accessing and obtaining specific information or data from a repository, database, file system, or any storage medium. This retrieval may involve searching for and retrieving various types of content such as text documents, multimedia files, database records, web pages, or any digital information stored within the system. Content retrieval (and/or other tasks) may also involve subtasks. For example, before retrieval, content often needs to be indexed. Indexing involves organizing and structuring the data in a way that makes it easier and faster to retrieve. For instance, text documents might be indexed based on keywords, metadata, or other relevant information. Users or applications initiate content retrieval by submitting queries or requests to the system. These queries specify the criteria or conditions for the desired content. Queries can range from simple keyword searches to complex search criteria based on various parameters. The system performs a search operation based on the query parameters against the indexed content. This search operation may involve algorithms or techniques tailored to the type of content and the indexing method used. Once the search operation is completed, the system retrieves the content that matches the specified criteria. The retrieved content is then presented to the user or application.

Task segregator 208 may determine a first subset of the first plurality of tasks for a first artificial intelligence model, wherein the first artificial intelligence model is trained to generate prompt responses using a first prompt schema. Task segregator 208 may also determine a second subset of the first plurality of tasks for a first plurality of non-serialized functions, wherein the first plurality of non-serialized functions comprises a search function for a first task of the second subset, a calculation function for a second task of the second subset, and a schema selection function for a third task of the second subset.

To do so, the system may determine the nature of the task requested by the user or application. This includes identifying the specific objective, desired outcomes, and any constraints associated with the task. For instance, the system might determine if the task requires natural language understanding, text generation, code completion, or any other specific capability. Each component within the prompt orchestration system might have specialized capabilities or functionalities. For example, some components might excel at prompt design and optimization, while others might be better suited for interfacing with language models or handling authentication and security. The system assesses the capabilities of these components to determine which ones are best suited for specific tasks based on their strengths and functionalities. In some embodiments, the prompt orchestration system may decide which tasks should be performed by an artificial intelligence model and which tasks should be handled by other components (e.g., via non-serialized functions) based on various considerations related to the nature of the tasks, the capabilities of the artificial intelligence model, system architecture, and efficiency requirements. For example, artificial intelligence models, especially advanced language models like Generative Pre-trained Transformer (GPT) models, are proficient in handling complex natural language processing tasks such as text generation, language translation, summarization, and question answering. Tasks that require sophisticated language understanding or generation often leverage the artificial intelligence model's capabilities. In contrast, certain tasks might be better suited for other system components or services (e.g., via non-serialized functions). For example, tasks related to user authentication, prompt optimization, security enforcement, or managing prompt libraries might be handled more efficiently by dedicated components within the system rather than burdening the artificial intelligence model. For example, artificial intelligence models, especially large-scale models, require significant computational resources for processing tasks. Determining which tasks to allocate to the artificial intelligence model may depend on optimizing resource usage. Some tasks might be less computationally intensive and could be efficiently handled by other components to balance resource allocation.

Artificial intelligence model inference may take longer, especially for complex tasks or large models. Tasks that require near real-time responses or have strict latency requirements might be handled by other components to ensure faster response times, while tasks with more lenient timing constraints could be routed to the artificial intelligence model.

In some embodiments, each component within the prompt orchestration system might have specialized capabilities or functionalities. For example, some components might excel at prompt design and optimization, while others might be better suited for interfacing with language models or handling authentication and security. The system may assess the capabilities of these components to determine which ones are best suited for specific tasks based on their strengths and functionalities. Additionally or alternatively, the system may evaluate the current workload, resource availability, and system capacity. The system may aim to distribute tasks among different components in a way that optimizes resource utilization, maintains system performance, and prevents bottlenecks. Load balancing techniques may be employed to evenly distribute tasks among available components. Tasks with varying complexities or processing requirements may also be assigned to different components based on their ability to handle such tasks efficiently. For example, complex natural language understanding tasks might be routed to components equipped with advanced language models or artificial intelligence capabilities, while simpler tasks might be handled by other components.

In some embodiments, the system may have predefined metrics or algorithms to optimize task allocation based on performance goals. This could include minimizing response time, maximizing throughput, or ensuring high accuracy in task execution. Components might be assigned tasks dynamically based on historical performance data or real-time metrics. The system may also employ dynamic routing mechanisms that adapt based on changing conditions, priorities, or user preferences. For instance, if a particular component is overloaded or experiencing issues, the system might dynamically redirect tasks to other available components to ensure timely completion. Additionally or alternatively, the system may prioritize tasks based on user preferences or urgency, or predefined criteria might influence task allocation decisions. Certain tasks or users might be given higher priority, impacting how the system distributes tasks among its components.

System 200 may then process the second subset of the first plurality of tasks using the first plurality of non-serialized functions at search function component 210 and/or semantic analysis function 212. Additionally, or alternatively, the system may determine a schema for a first input using schema function component 214.

For example, a schema function component 214 may play a crucial role in creating a template or structure that defines how data should be formatted, organized, and processed within an artificial intelligence model component (e.g., artificial intelligence model 216). This schema acts as a blueprint or guideline for the model to understand and process input data or prompts effectively. The schema function may specify the format and structure of the input data that the AI model component expects to receive. This includes defining the types of input data (text, images, structured data), their representation (e.g., JSON, XML), and any required metadata. For natural language processing tasks, the schema function defines features or elements within the input text that the model should pay attention to. This might include specifying keywords, context markers, or other linguistic cues relevant to the task. Guidelines for preprocessing input data before feeding it into the model may also be included in the schema. This can involve text normalization, tokenization, cleaning, or other preprocessing steps required to prepare the data for the model. The schema function may also outline the specific task or tasks that the model component is designed to perform.

The schema function may define the format of the output or response expected from the model. This might include specifying the structure of generated text, data format for predictions, or any post-processing steps needed to interpret the model's output. Guidelines for handling errors, exceptions, or invalid inputs may be part of the schema. It may include validation rules to ensure the input data meets certain criteria or standards before processing. The schema function might incorporate mechanisms for versioning and evolving the schema over time. This allows for updates, changes, or enhancements to the template as the model evolves or new requirements emerge.

Schema function component 214 may then generate a first input for the first artificial intelligence model (e.g., artificial intelligence model 216) based on a first output from the search function, a second output from the calculation function, and a third output from the schema selection function.

System 200 may then input the first input into the first artificial intelligence model (e.g., artificial intelligence model 216) to generate the first prompt response to generate for display, on user interface 202, the first prompt response.

Figure 3A:
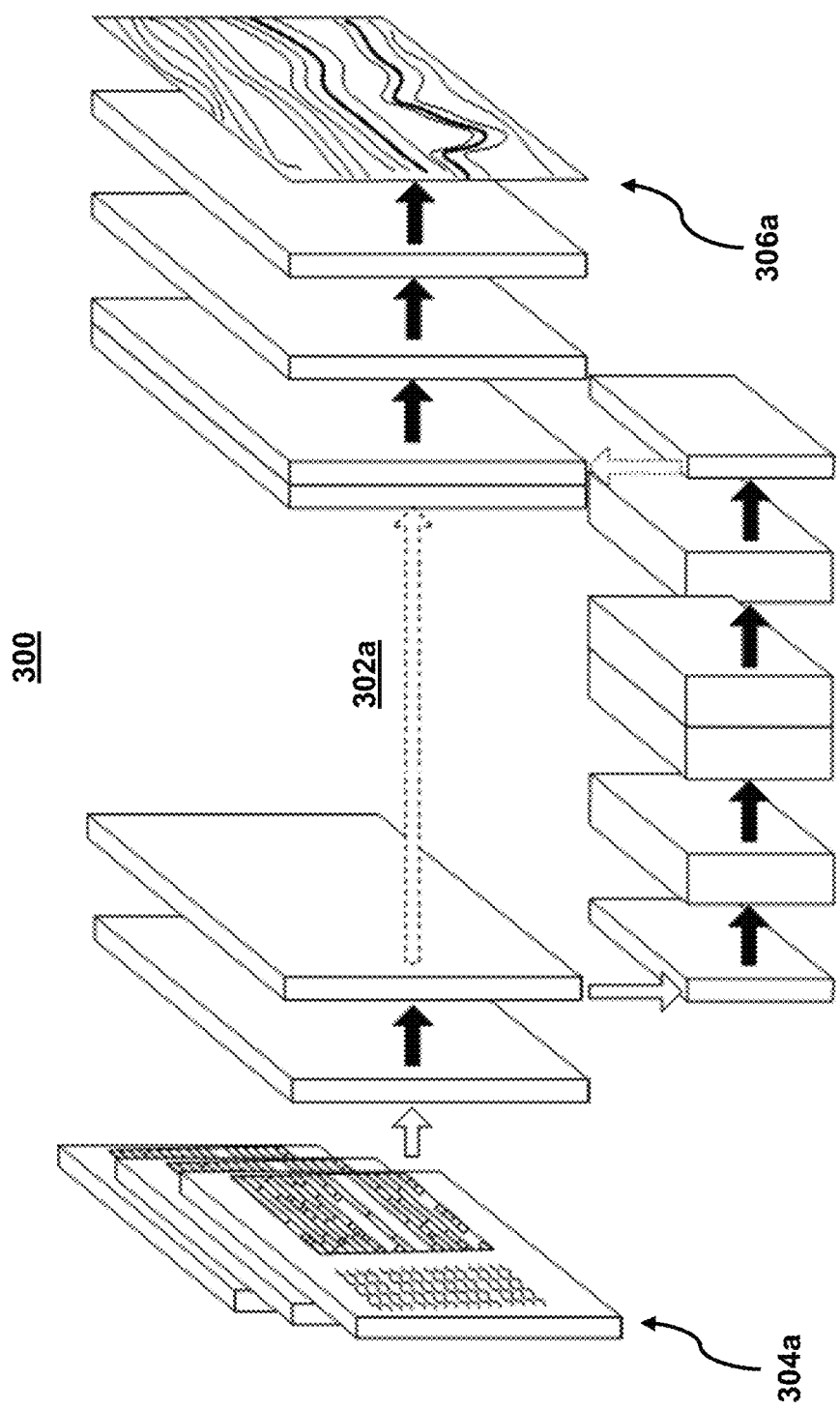
FIGS. 3A-B show illustrative components for a system used for an artificial intelligence-based solution for a prompt orchestration system, in accordance with one or more embodiments.
Figure 3B:
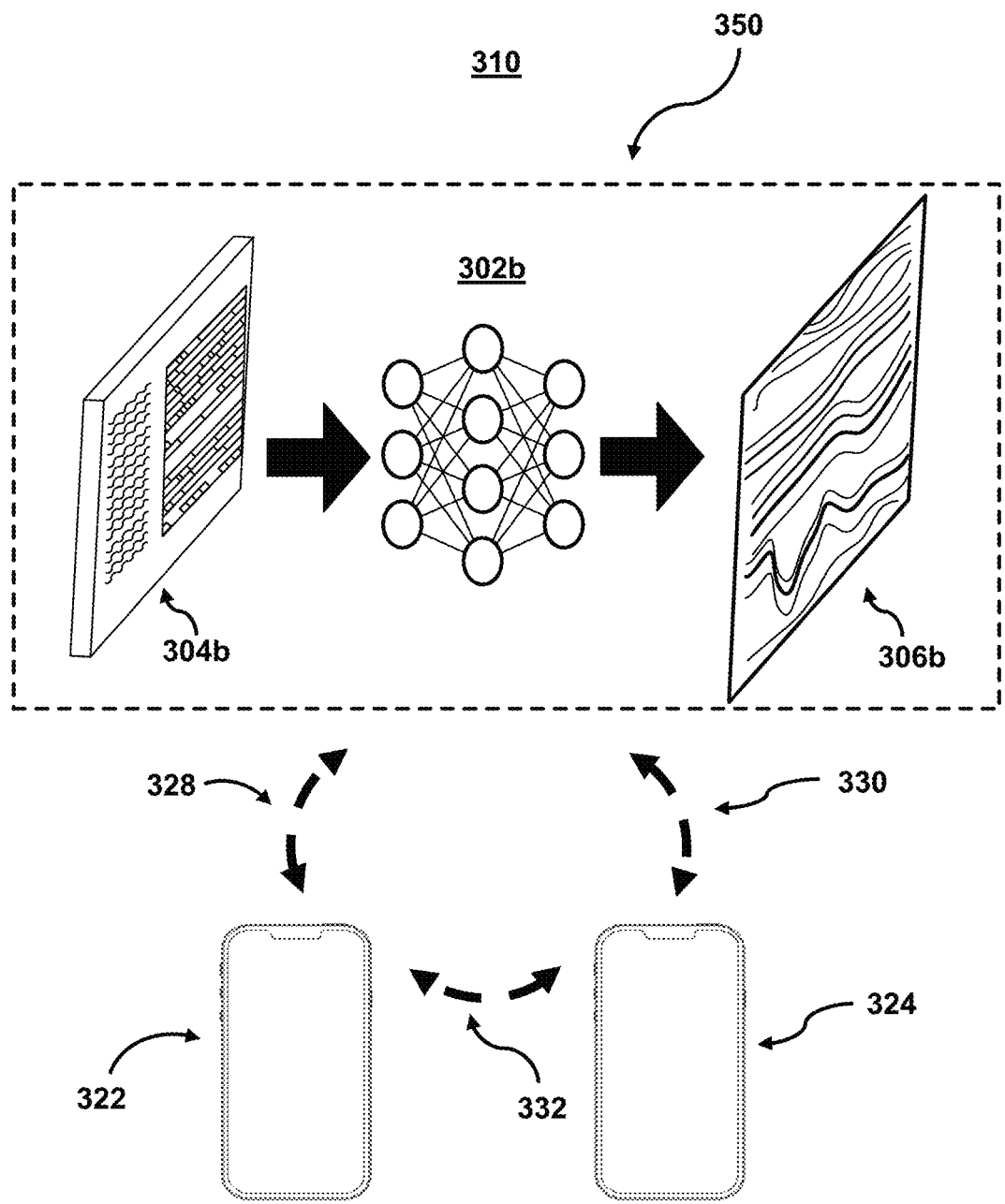

FIGS. 3A-B shows illustrative components for a system used for an artificial intelligence-based solution for a prompt orchestration system, in accordance with one or more embodiments. For example, FIG. 3A may represent a model architecture used to generate prompt responses. For example, the system may generate a first input for the first artificial intelligence model based on a first output from the search function, a second output from the calculation function, and a third output from the schema selection function. The system may then input the first input into the first artificial intelligence model to generate the first prompt response to generate for display the first prompt response.

System 300 also includes model 302a, which may be a machine learning model, artificial intelligence model, etc. (which may be referred collectively as "models" herein).

Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302a (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first model to classify the first labeled feature input with the known prediction (e.g., a prediction for a task).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306. In some embodiments, the model (e.g., model 302a) may not perform any actions. The output of the model (e.g., model 302a) may be used to complete a task. In some embodiments, the system may be designed as a reinforcement learning system that collects its scores based on user satisfaction rating, quality of output, and/or compute resources used and uses this metric to retain and improve itself.

FIG. 3B shows illustrative components for a system used to implement an artificial intelligence-based solution for a prompt orchestration system, in accordance with one or more embodiments. For example, FIG. 3B may show illustrative components for an artificial intelligence-based solution for a prompt orchestration system. As shown in FIG. 3B, system 310 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system and may feature one or more component devices. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on mobile device 322 or mobile device 324. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of the API layer 350 may provide integration between front-end and back-end. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

As shown in FIG. 3B, in some embodiments, model 302b may be trained by taking inputs 304b and providing outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, back propagation techniques may be utilized by model 302b where forward stimulation is used to reset weights on the "front" neural units. In some embodiments, stimulation and inhibition for model 302 may be more free flowing, with connections interacting in a more chaotic and complex fashion. During testing, an output layer of model 302b may indicate whether or not a given input corresponds to a classification of model 302b (e.g., a classification used to complete a task).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
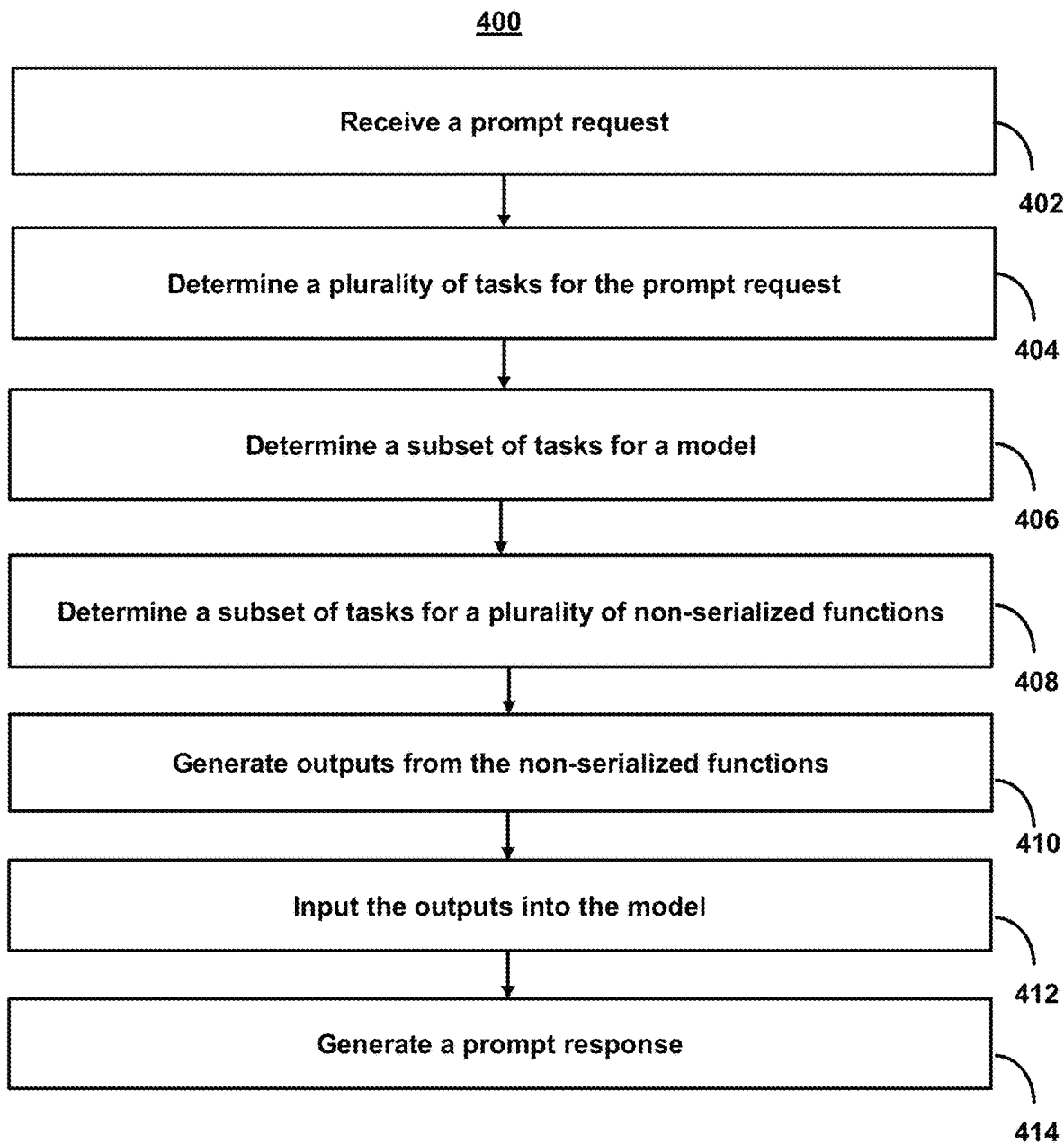
FIG. 4 shows a flowchart of the steps involved in implementing an artificial intelligence-based solution for a prompt orchestration system, in accordance with one or more embodiments.

FIG. 4 shows a flowchart of the steps involved in implementing an artificial intelligence-based solution for a prompt orchestration system, in accordance with one or more embodiments. For example, the system may use process 400 (e.g., as implemented on one or more system components described above) in order to implement an artificial intelligence-based solution for prompt orchestration by segregating processing requests into non-serialized, function-specific subtasks.

At step 402, process 400 (e.g., using one or more components described above) receives a prompt request. For example, the system may receive a first prompt request, wherein the first prompt request comprises a prompt requirement and a prompt context. For example, the system may receive a prompt request from a user interface through well-defined communication channels and protocols. The system may receive a user interaction with the user interface provided by the prompt orchestration system. This interface may be a web application, a command-line interface (CLI), an API endpoint, or any other interface designed to accept user input. The system may receive the user input of the prompt request, specifying the task to be performed by the system, which may involve entering text, uploading files, selecting options, or providing parameters related to the desired task. In response to receiving the first prompt request, the system may select a secure communication protocol from a plurality of secure communication protocols for transmitting the first prompt request. The system may then transmit the first prompt request via the secure communication protocol.

At step 404, process 400 (e.g., using one or more components described above) determines a plurality of tasks for the prompt request. For example, the system may determine, at a prompt orchestration microservice, a first plurality of tasks for responding to the first prompt request. The plurality of tasks in a prompt request may refer to the potential inclusion of multiple tasks or objectives within a single prompt submitted by a user or an application. Rather than requesting a single specific action or outcome, the prompt may encompass several distinct tasks to be performed by the system. The plurality of tasks within a prompt request may allow users to initiate a series of actions or queries within a single interaction with the system, enhancing efficiency and reducing the need for multiple separate requests. This approach is particularly useful when dealing with related or dependent tasks that are logically connected or when users want to obtain multiple outputs simultaneously.

In some embodiments, the system may determine the first plurality of tasks for responding to the first prompt request may comprise determining data values required to generate the first prompt response and determining a plurality of functions for obtaining the data values. For example, the system may analyze the initial prompt request to understand the user's query or task requirements. The system may break down the request to identify the specific data values or information needed to fulfill the task. Based on the identified task or tasks within the prompt request, the system determines the data values required to generate the initial prompt response. These could include variables, inputs, parameters, or context necessary for the subsequent processing. Once the required data values are determined, the system identifies a plurality of functions or methods capable of obtaining these data values. These functions could be diverse, involving various data sources, APIs, internal databases, external services, or other components. For example, each function is responsible for obtaining a specific set of data values required for generating the prompt response. These functions might perform tasks such as querying databases, calling APIs, processing user inputs, accessing external sources, or executing specific algorithms to gather the necessary information. The system initiates the plurality of functions identified earlier to retrieve the required data values. Each function executes its designated task to collect the relevant data. Once the data values are obtained, the system processes and integrates these values to prepare the data for subsequent use. This could involve data transformation, normalization, or any necessary preprocessing steps. By systematically determining the required data values, identifying relevant functions for data acquisition, retrieving the necessary information, and processing it to generate the initial prompt response, the prompt orchestration system ensures that the response meets the user's query and initiates the task execution flow within the system.

In some embodiments, determining the first plurality of tasks for responding to the first prompt request may comprise determining a data lineage for generating the first prompt response and selecting the first plurality of tasks based on the data lineage. For example, determining the first plurality of tasks for responding to the initial prompt request involves analyzing data lineages to understand the flow of data and dependencies required to generate the response. The system then selects the initial tasks based on these data lineages. For example, the system may analyze the initial prompt request to identify the data dependencies necessary to fulfill the request. This involves understanding the relationships between different data elements, variables, or inputs required to generate the response. The system may trace the flow of data through the system, mapping the paths and connections between various data sources, processing steps, transformations, and final output that contributes to generating the response. The system may initiate the selected tasks based on the determined data lineages. These tasks could involve fetching data from specific sources, performing transformations, aggregating information, or other actions necessary to obtain the required data elements. During task execution, the system may ensure the consistency and accuracy of the retrieved data to maintain the integrity of the response generation process.

In some embodiments, determining the first plurality of tasks for responding to the first prompt request, the system may determine a plurality of task categories for generating the first prompt response and select the first plurality of tasks based on the plurality of task categories. For example, determining the first plurality of tasks for responding to the initial prompt request may involve categorizing tasks based on task categories and selecting the appropriate tasks for generating the response. For example, the system may analyze the nature of the initial prompt request and categorize tasks into different task categories based on the requirements, objectives, or types of actions needed to fulfill the request. These task categories could include, but are not limited to information retrieval tasks, data processing or transformation tasks, artificial intelligence model inference or computation tasks, and/or data aggregation or summarization tasks. Each task category may have specific attributes or criteria defining the nature, inputs, outputs, and methodologies associated with tasks falling within that category. Based on the nature of the initial prompt request, the system may identify and select the relevant plurality of task categories that align with the requirements of the prompt. This involves determining which task categories are most suitable for addressing the user's query or task objectives. For each selected task category, the system may further narrow down the selection to specific tasks or actions that belong to those categories.

At step 406, process 400 (e.g., using one or more components described above) determines a subset of tasks for a model. For example, the system may determine, at the prompt orchestration microservice, a first subset of the first plurality of tasks for a first artificial intelligence model, wherein the first artificial intelligence model is trained to generate prompt responses using a first prompt schema.

In some embodiments, the system may determine the first subset of the first plurality of tasks for the first artificial intelligence model by determining a current processing load for the first artificial intelligence model and selecting the first subset from the first plurality of tasks based on the current processing load. For example, determining the first subset of tasks for the first artificial intelligence model in a prompt orchestration system may involve assessing the current processing load of the artificial intelligence model and select a subset of tasks from the initial plurality of tasks based on this load. For example, the prompt orchestration system may continuously monitor the current processing load of the first artificial intelligence model. This monitoring involves tracking factors such as CPU or GPU utilization, memory usage, queue backlog, or any other relevant metrics that indicate the model's computational workload. The system may use real-time monitoring or historical data to assess the artificial intelligence model's current processing load accurately. This data helps in understanding the model's capacity to handle additional tasks at a given time. Using the information gathered about the artificial intelligence model's current processing load, the system may select a subset of tasks from the initial plurality of tasks that the model can handle without exceeding its processing capacity. Additionally or alternatively, the system may dynamically adjust task assignment to the artificial intelligence model based on fluctuations in the processing load. If the load increases or decreases, tasks may be reassigned or queued accordingly to maintain a balanced workload. In some embodiments, the system may have predefined load thresholds or policies that dictate how tasks are assigned concerning the model's load. For example, tasks might be queued during high-load periods and released gradually as the load decreases. By dynamically selecting a subset of tasks based on the current processing load of the first artificial intelligence model, the prompt orchestration system may ensure efficient utilization of the model's resources while maintaining responsiveness and performance within acceptable thresholds. This approach enables effective task allocation and load balancing to optimize the utilization of computational resources.

In some embodiments, determining the first subset of the first plurality of tasks for the first artificial intelligence model may comprise the system determining a performance metric for the first artificial intelligence model and selecting the first subset from the first plurality of tasks based on the performance metric. For example, determining the first subset of tasks for the first artificial intelligence model in a prompt orchestration system may involve evaluating the model's performance using specific metrics and selecting tasks from the initial plurality of tasks based on these metrics. The prompt orchestration system may define relevant performance metrics that gauge the model's effectiveness. These metrics may include accuracy, inference speed, resource utilization, error rates, or any other criteria indicative of the model's performance. The system may assess the model's performance against these predefined metrics. This evaluation could be based on historical data, benchmarks, or real-time analysis of the model's behavior when handling various tasks. Using the evaluated performance metrics, the system selects a subset of tasks from the initial plurality of tasks that align with the model's strengths and performance capabilities. Tasks are chosen based on their alignment with the model's strengths as indicated by the performance metrics. For instance, tasks requiring high accuracy might be assigned if the model excels in accuracy, while tasks demanding fast inference might be allocated if the model demonstrates superior speed. In some embodiments, tasks are prioritized and allocated to the model according to its performance capabilities. This ensures that tasks that leverage the model's strengths are given higher priority for execution. The system may also dynamically adjust task allocation based on the real-time performance of the AI model. If the model's performance changes or improves, the task assignment might be adapted accordingly to optimize its usage.

In some embodiments, determining the first subset of the first plurality of tasks for the first artificial intelligence model comprises determining a prompt request frequency and selecting the first subset from the first plurality of tasks based on the prompt request frequency. For example, determining the first subset of tasks for the initial artificial intelligence model in a prompt orchestration system based on prompt request frequency may involve evaluating the frequency of specific types of requests and selecting tasks accordingly. In such cases, the prompt orchestration system tracks and records the frequency of different types of prompt requests received over a given period. This involves monitoring the volume and types of requests made to the system. Requests are categorized based on their nature, complexity, or specific tasks they entail. For instance, requests for different types of analyses, translations, or information retrieval could be categorized separately. Using the analyzed prompt request frequency data, the system selects a subset of tasks from the initial plurality of tasks that correspond to the most frequent or high-priority request types. Tasks associated with request types that occur more frequently or hold higher priority due to user demand or system requirements are chosen for inclusion in the subset.

In some embodiments, determining the first subset of the first plurality of tasks for the first artificial intelligence model may comprise the system determining a prompt queue length for the first artificial intelligence model and selecting the first subset from the first plurality of tasks based on the prompt queue length. For example, determining a prompt queue length for the first artificial intelligence model in a prompt orchestration system may involve assessing the number of pending tasks or requests in the queue awaiting processing by the model. The prompt orchestration system continually monitors the queue containing pending tasks or requests designated for the model. It tracks the number of tasks currently waiting in the queue for processing. By observing the queue, the system assesses the current queue length, which indicates the number of pending tasks that need to be processed by the model. Using the evaluated queue length, the system selects a subset of tasks from the initial plurality of tasks. The selection is based on the current queue length and aims to optimize task assignment considering the workload in the queue. Tasks are chosen or prioritized based on the queue length. For example, if the queue is relatively short, more tasks might be assigned to the model to maintain efficiency. Conversely, during high queue lengths, the system might limit task assignments to manage the load.

At step 408, process 400 (e.g., using one or more components described above) determines a subset of tasks for a plurality of non-serialized functions. For example, the system may determine, at the prompt orchestration microservice, a second subset of the first plurality of tasks for a first plurality of non-serialized functions. In some embodiments, the first plurality of non-serialized functions may comprise a search function for a first task of the second subset, a calculation function for a second task of the second subset, and a schema selection function for a third task of the second subset. A non-serialized function may refer to a function or method that is not serialized, meaning it does not undergo serialization or does not support serialization explicitly. For example, serialization involves converting a data structure, object, or function into a format that can be easily stored, transmitted, or reconstructed. When a function is said to be non-serialized, it means that the function or method is not designed to be serialized or transformed into a format that can be saved to persistent storage, transmitted over a network, or reconstructed in another context.

At step 410, process 400 (e.g., using one or more components described above) generates the outputs from the non-serialized functions. For example, the system may generate a plurality of outputs from the first plurality of non-serialized functions.

At step 412, process 400 (e.g., using one or more components described above) inputs the outputs into the model. For example, the system may generate, at the prompt orchestration microservice, a first input for the first artificial intelligence model based on outputs from the first plurality of non-serialized functions. For example, the plurality of outputs from the first plurality of non-serialized functions comprises a first output from the search function, a second output from the calculation function, and a third output from the schema selection function. The system may then input the first input into the first artificial intelligence model to generate a first prompt response.

In some embodiments, the system may determine a prompt request type for the first prompt request. For example, the system may determine the prompt request type for the first prompt request in a prompt orchestration system involves categorizing or identifying the nature of the user's query or task. The system may classify the prompt request into predefined categories or types based on its characteristics, content, or context. For instance, requests might be categorized into types such as information retrieval, data analysis, language translation, summarization, or other relevant task types. The system may select the first prompt schema from a plurality of prompt schemas based on the prompt request type. For example, the system may select the first prompt schema from a plurality of prompt schemas in a prompt orchestration system based on the prompt request type by matching the characteristics or requirements of the request type with the corresponding schema designed to handle such requests. The prompt orchestration system may establish multiple prompt schemas, each defining a structure, format, or set of instructions for processing specific types of requests. These schemas are designed to cater to various request types or categories. The system may select a first artificial intelligence model from a plurality of models based on the first prompt schema. For example, the prompt schemas are categorized or tagged based on the types of requests they can effectively handle. For instance, there might be schemas designated for information retrieval, language translation, data analysis, summarization, or other task-specific schemas.

In some embodiments, the system may select a first input template based on the first prompt schema. The system may populate the first input template with the outputs from the first plurality of non-serialized functions. For example, the system may select a first input template based on the first prompt schema by identifying a structured template that aligns with the schema's specifications and requirements for processing the specific type of request. For example, the prompt orchestration system examines the specifications and guidelines outlined in the first prompt schema. This may involve understanding the structure, format, and expected input parameters or elements defined within the schema. Based on the requirements specified in the prompt schema, the system may design a set of input templates or structured formats. These templates are designed to facilitate the gathering of necessary information or inputs for processing the specific request type. The created input templates are crafted to align with the schema's requirements, ensuring that the elements within the template correspond to the parameters or attributes specified in the schema. The templates are designed to capture the information needed for task execution.

At step 414, process 400 (e.g., using one or more components described above) generates a prompt response. For example, the system may generate for display, on a user interface, the first prompt response. The prompt orchestration system may generate the prompt response on a user interface by coordinating the execution of tasks, processing the request, and formatting the output or results for display to the user. In some embodiments, the system may format the results or output according to the requirements of the user interface. This might involve structuring the data, organizing it into a readable format, converting it into a specific display format (e.g., text, tables, charts, or multimedia), and applying any necessary styling or customization. Based on the formatted data and processed results, the system constructs the actual response or output that will be presented to the user. This could include combining text, images, graphs, or any other relevant information to create a coherent and meaningful response. The generated response is then sent or integrated into the user interface. This could involve updating a web page, populating a graphical user interface (GUI) with the response data, or transmitting the response through an API call to be displayed in another application or system.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for implementing an artificial intelligence-based solution for prompt orchestration by segregating processing requests into non-serialized, function-specific subtasks.

2. The method of the preceding embodiment, further comprising: receiving a first prompt request, wherein the first prompt request comprises a prompt requirement and a prompt context; determining, at a prompt orchestration microservice, a first plurality of tasks for responding to the first prompt request; determining, at the prompt orchestration microservice, a first subset of the first plurality of tasks for a first artificial intelligence model, wherein the first artificial intelligence model is trained to generate prompt responses using a first prompt schema; determining, at the prompt orchestration microservice, a second subset of the first plurality of tasks for a first plurality of non-serialized functions; generating a plurality of outputs from the first plurality of non-serialized functions; generating, at the prompt orchestration microservice, a first input for the first artificial intelligence model based on outputs from the first plurality of non-serialized functions; inputting the first input into the first artificial intelligence model to generate a first prompt response; and generating for display, on a user interface, the first prompt response.

3. The method of any one of the preceding embodiments, further comprising: in response to receiving the first prompt request, selecting a secure communication protocol from a plurality of secure communication protocols for transmitting the first prompt request; and transmitting the first prompt request via the secure communication protocol.

4. The method of any one of the preceding embodiments, wherein the first plurality of non-serialized functions comprises a search function for a first task of the second subset, a calculation function for a second task of the second subset, and a schema selection function for a third task of the second subset.

5. The method of any one of the preceding embodiments, wherein the plurality of outputs from the first plurality of non-serialized functions comprises a first output from the search function, a second output from the calculation function, and a third output from the schema selection function.

6. The method of any one of the preceding embodiments, wherein determining the first plurality of tasks for responding to the first prompt request further comprises: determining data values required to generate the first prompt response; and determining a plurality of functions for obtaining the data values.

7. The method of any one of the preceding embodiments, wherein determining the first plurality of tasks for responding to the first prompt request further comprises: determining a data lineage for generating the first prompt response; and selecting the first plurality of tasks based on the data lineage.

8. The method of any one of the preceding embodiments, wherein determining the first plurality of tasks for responding to the first prompt request further comprises: determining a plurality of task categories for generating the first prompt response; and selecting the first plurality of tasks based on the plurality of task categories.

9. The method of any one of the preceding embodiments, wherein determining the first subset of the first plurality of tasks for the first artificial intelligence model further comprises: determining a current processing load for the first artificial intelligence model; and selecting the first subset from the first plurality of tasks based on the current processing load.

10. The method of any one of the preceding embodiments, wherein determining the first subset of the first plurality of tasks for the first artificial intelligence model further comprises: determining a performance metric for the first artificial intelligence model; and selecting the first subset from the first plurality of tasks based on the performance metric.

11. The method of any one of the preceding embodiments, wherein determining the first subset of the first plurality of tasks for the first artificial intelligence model further comprises: determining a prompt request frequency; and selecting the first subset from the first plurality of tasks based on the prompt request frequency.

12. The method of any one of the preceding embodiments, wherein determining the first subset of the first plurality of tasks for the first artificial intelligence model further comprises: determining a prompt queue length for the first artificial intelligence model; and selecting the first subset from the first plurality of tasks based on the prompt queue length.

13. The method of any one of the preceding embodiments, further comprising: determining a prompt request type for the first prompt request; selecting the first prompt schema from a plurality of prompt schemas based on the prompt request type; and selecting a first artificial intelligence model from a plurality of models based on the first prompt schema.

14. The method of any one of the preceding embodiments, wherein generating the first input further comprises: selecting a first input template based on the first prompt schema; and populating the first input template with the outputs from the first plurality of non-serialized functions.

15. A tangible, non-transitory, computer-readable medium storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for implementing an artificial intelligence-based solution for prompt orchestration by segregating processing requests into non-serialized, function-specific subtasks, the system comprising:
   one or more processors; and
   one or more non-transitory, computer-readable mediums comprising instructions that, when executed by one or more processors, cause operations comprising:
      receiving, via a user interface, a first prompt request, wherein the first prompt request comprises a prompt requirement and a prompt context, wherein the prompt requirement comprises a requirement for a first prompt response, and wherein the prompt context comprises a context for generating the first prompt response;
      in response to receiving the first prompt request, transmitting the first prompt request via a secure communication protocol;
      receiving, at a prompt orchestration microservice, the first prompt request;
      determining, at the prompt orchestration microservice, a first plurality of tasks for responding to the first prompt request;
      determining, at the prompt orchestration microservice, a first subset of the first plurality of tasks for a first artificial intelligence model, wherein the first artificial intelligence model is trained to generate prompt responses using a first prompt schema;
      determining, at the prompt orchestration microservice, a second subset of the first plurality of tasks for a first plurality of non-serialized functions, wherein the first plurality of non-serialized functions comprises a search function for a first task of the second subset, a calculation function for a second task of the second subset, and a schema selection function for a third task of the second subset;
      processing the second subset of the first plurality of tasks using the first plurality of non-serialized functions;
      generating, at the prompt orchestration microservice, a first input for the first artificial intelligence model based on a first output from the search function, a second output from the calculation function, and a third output from the schema selection function;
      inputting the first input into the first artificial intelligence model to generate the first prompt response; and
      generating for display, on the user interface, the first prompt response.

2. A method for implementing an artificial intelligence-based solution for prompt orchestration by segregating processing requests into non-serialized, function-specific subtasks, the method comprising:
   receiving a first prompt request, wherein the first prompt request comprises a prompt requirement and a prompt context;
   determining, at a prompt orchestration microservice, a first plurality of tasks for responding to the first prompt request;
   determining, at the prompt orchestration microservice, a first subset of the first plurality of tasks for a first artificial intelligence model, wherein the first artificial intelligence model is trained to generate prompt responses using a first prompt schema;

determining, at the prompt orchestration microservice, a second subset of the first plurality of tasks for a first plurality of non-serialized functions;

generating a plurality of outputs from the first plurality of non-serialized functions;

generating, at the prompt orchestration microservice, a first input for the first artificial intelligence model based on outputs from the first plurality of non-serialized functions;

inputting the first input into the first artificial intelligence model to generate a first prompt response; and generating for display, on a user interface, the first prompt response.

3. The method of claim 2, further comprising:
in response to receiving the first prompt request, selecting a secure communication protocol from a plurality of secure communication protocols for transmitting the first prompt request; and
transmitting the first prompt request via the secure communication protocol.

4. The method of claim 2, wherein the first plurality of non-serialized functions comprises a search function for a first task of the second subset, a calculation function for a second task of the second subset, and a schema selection function for a third task of the second subset.

5. The method of claim 4, wherein the plurality of outputs from the first plurality of non-serialized functions comprises a first output from the search function, a second output from the calculation function, and a third output from the schema selection function.

6. The method of claim 2, wherein determining the first plurality of tasks for responding to the first prompt request further comprises:
determining data values required to generate the first prompt response; and
determining a plurality of functions for obtaining the data values.

7. The method of claim 2, wherein determining the first plurality of tasks for responding to the first prompt request further comprises:
determining a data lineage for generating the first prompt response; and
selecting the first plurality of tasks based on the data lineage.

8. The method of claim 2, wherein determining the first plurality of tasks for responding to the first prompt request further comprises:
determining a plurality of task categories for generating the first prompt response; and
selecting the first plurality of tasks based on the plurality of task categories.

9. The method of claim 2, wherein determining the first subset of the first plurality of tasks for the first artificial intelligence model further comprises:
determining a current processing load for the first artificial intelligence model; and
selecting the first subset from the first plurality of tasks based on the current processing load.

10. The method of claim 2, wherein determining the first subset of the first plurality of tasks for the first artificial intelligence model further comprises:
determining a performance metric for the first artificial intelligence model; and
selecting the first subset from the first plurality of tasks based on the performance metric.

11. The method of claim 2, wherein determining the first subset of the first plurality of tasks for the first artificial intelligence model further comprises:
determining a prompt request frequency; and
selecting the first subset from the first plurality of tasks based on the prompt request frequency.

12. The method of claim 2, wherein determining the first subset of the first plurality of tasks for the first artificial intelligence model further comprises:
determining a prompt queue length for the first artificial intelligence model; and
selecting the first subset from the first plurality of tasks based on the prompt queue length.

13. The method of claim 2, further comprising:
determining a prompt request type for the first prompt request;
selecting the first prompt schema from a plurality of prompt schemas based on the prompt request type; and
selecting a first artificial intelligence model from a plurality of models based on the first prompt schema.

14. The method of claim 2, wherein generating the first input further comprises:
selecting a first input template based on the first prompt schema; and
populating the first input template with the outputs from the first plurality of non-serialized functions.

15. One or more non-transitory, computer-readable mediums comprising instructions that, when executed by one or more processors, cause operations comprising:
receiving a first prompt request, wherein the first prompt request comprises a prompt requirement and a prompt context;
determining a first plurality of tasks for responding to the first prompt request;
determining a first subset of the first plurality of tasks for a first artificial intelligence model, wherein the first artificial intelligence model is trained to generate prompt responses using a first prompt schema;
determining a second subset of the first plurality of tasks for a first plurality of non-serialized functions;
generating a plurality of outputs from the first plurality of non-serialized functions;
generating a first input for the first artificial intelligence model based on outputs from the first plurality of non-serialized functions;
inputting the first input into the first artificial intelligence model to generate a first prompt response; and
generating for display, on a user interface, the first prompt response.

16. The one or more non-transitory, computer-readable mediums of claim 15, wherein the instructions further cause operations comprising:
in response to receiving the first prompt request, selecting a secure communication protocol from a plurality of secure communication protocols for transmitting the first prompt request; and
transmitting the first prompt request via the secure communication protocol.

17. The one or more non-transitory, computer-readable mediums of claim 15, wherein the first plurality of non-serialized functions comprises a search function for a first task of the second subset, a calculation function for a second task of the second subset, and a schema selection function for a third task of the second subset.

18. The one or more non-transitory, computer-readable mediums of claim 17, wherein the plurality of outputs from the first plurality of non-serialized functions comprises a first output from the search function, a second output from the calculation function, and a third output from the schema selection function.

19. The one or more non-transitory, computer-readable mediums of claim 15, wherein determining the first plurality of tasks for responding to the first prompt request further comprises:
   determining data values required to generate the first prompt response; and
   determining a plurality of functions for obtaining the data values.

20. The one or more non-transitory, computer-readable mediums of claim 15, wherein determining the first subset of the first plurality of tasks for the first artificial intelligence model further comprises:
   determining a prompt queue length for the first artificial intelligence model; and
   selecting the first subset from the first plurality of tasks based on the prompt queue length.

\* \* \* \* \*